United States Patent
Vivet et al.

(10) Patent No.: US 11,282,216 B2
(45) Date of Patent: *Mar. 22, 2022

(54) IMAGE NOISE REDUCTION

(71) Applicant: Imagination Technologies Limited, Kings Langley (GB)

(72) Inventors: Marc Vivet, Barcelona (ES); Paul Brasnett, West Molesey (GB)

(73) Assignee: Imagination Technologies Limited, Kings Langley (GB)

( * ) Notice: Subject to any disclaimer, the term of this patent is extended or adjusted under 35 U.S.C. 154(b) by 3 days.

This patent is subject to a terminal disclaimer.

(21) Appl. No.: 16/865,884

(22) Filed: May 4, 2020

(65) Prior Publication Data

US 2020/0265595 A1  Aug. 20, 2020

Related U.S. Application Data

(63) Continuation of application No. 15/877,552, filed on Jan. 23, 2018, now Pat. No. 10,679,363, which is a (Continued)

(30) Foreign Application Priority Data

Mar. 13, 2015 (GB) ..................... 1504316

(51) Int. Cl.
*G06T 7/30* (2017.01)
*G06T 5/50* (2006.01)
(Continued)

(52) U.S. Cl.
CPC .............. *G06T 7/30* (2017.01); *G06K 9/6203* (2013.01); *G06T 5/002* (2013.01); *G06T 5/50* (2013.01);
(Continued)

(58) Field of Classification Search
CPC ......... G06T 7/0026; G06T 7/32; G06T 5/002; G06T 5/50; G06K 9/6203
See application file for complete search history.

(56) References Cited

U.S. PATENT DOCUMENTS

2007/0242900 A1  10/2007  Chen et al.
2009/0234626 A1   9/2009  Yu et al.
(Continued)

FOREIGN PATENT DOCUMENTS

CN   103729845 A   4/2014
CN   103778433 A   5/2014
(Continued)

OTHER PUBLICATIONS

Liu et al., "Motion Estimation (I)," Course 6.869 Advances in Computer Vision, Microsoft Research New England, Apr. 21, 2010.
(Continued)

*Primary Examiner* — David F Dunphy
(74) *Attorney, Agent, or Firm* — Potomac Law Group, PLLC; Vincent M DeLuca

(57) ABSTRACT

A reduced noise image can be formed from a set of images. One of the images of the set can be selected to be a reference image and other images of the set are transformed such that they are better aligned with the reference image. A measure of the alignment of each image with the reference image is determined. At least some of the transformed images can then be combined using weights which depend on the alignment of the transformed image with the reference image to thereby form the reduced noise image. By weighting the images according to their alignment with the reference image the effects of misalignment between the images in the combined image are reduced. Furthermore, motion correction may be applied to the reduced noise image.

20 Claims, 8 Drawing Sheets

Related U.S. Application Data continuation of application No. 15/068,899, filed on Mar. 14, 2016.

(51) Int. Cl.
    *G06T 5/00*    (2006.01)
    *G06T 7/32*    (2017.01)
    *G06K 9/62*    (2006.01)

(52) U.S. Cl.
    CPC ...... *G06T 7/32* (2017.01); *G06T 2207/10016* (2013.01)

(56) References Cited

U.S. PATENT DOCUMENTS

| | | |
|---|---|---|
| 2011/0142370 A1 | 6/2011 | Joshi et al. |
| 2011/0211758 A1 | 9/2011 | Joshi et al. |
| 2013/0076915 A1 | 3/2013 | Ramachandran et al. |
| 2013/0271664 A1 | 10/2013 | Mathew et al. |
| 2013/0286259 A1 | 10/2013 | Tanaka |
| 2014/0029851 A1 | 1/2014 | Tai et al. |
| 2014/0104295 A1 | 4/2014 | Sorkine-Hornung et al. |
| 2014/0168486 A1 | 6/2014 | Geiss |
| 2015/0010247 A1 | 1/2015 | Tanaka |
| 2016/0012613 A1 | 1/2016 | Okerlund et al. |
| 2017/0127046 A1 | 5/2017 | Das |

FOREIGN PATENT DOCUMENTS

| | | |
|---|---|---|
| CN | 103903280 A | 7/2014 |
| CN | 104200216 A | 12/2014 |
| CN | 104205804 A | 12/2014 |

OTHER PUBLICATIONS

Megret et al.,"Inverse Composition for Multi-Kernel Tracking," ICVGIP 2006, LNCS 4338, pp. 480-491.

Hager et al., "Multiple Kernel Tracking with SSD," Proceedings of the 2004 IEEE Computer Society Conference on Computer Vision and Pattern Recognition, Jun. 27-Jul. 2, 2004, Washington DC, vol. 1, pp. 790-797.

Shen et al., "Robust Visual Tracking by Integrating Lucas-Kanade into Mean-Shift," IEEE Sixth International Conference on Image and Graphics (ICIG), Aug. 12, 2011, pp. 660-666.

Baker et al., "Lucas-Kanade 20 Years On: A Unifying Framework," International Journal of Computer Vision, 2004, vol. 56:3, pp. 221-255, Kluwer Academic Publishers, The Netherlands.

Schreiber, "Generalizing the Lucas-Kanade algorithm for histogram-based tracking," Pattern Recognition Letters, 2008, vol. 29, pp. 852-861, ScienceDirect, Elsevier.

Sevilla-Lara, et al., "Distribution Fields for Tracking," IEEE Conference on Computer Vision and Pattern Recognition (CVPR), Jun. 2012, pp. 1910-1917.

\*\*NPL in parent\*\*.

IMAGE NOISE REDUCTION

CROSS-REFERENCE TO RELATED APPLICATIONS AND CLAIM OF PRIORITY

This application is a continuation, under 35 U.S.C. 120, of copending application Ser. No. 15/877,552 filed Jan. 23, 2018, which is a continuation of prior application Ser. No. 15/068,899 filed Mar. 14, 2016, which claims foreign priority from United Kingdom Application No. 1504316.9 filed Mar. 13, 2015 under 35 U.S.C. 119.

BACKGROUND

Cameras are used to capture images. Often images are noisy in the sense that there is some image noise present in the image. The image noise may be random (or pseudo-random) such that there is little or no correlation between the image noise of two different images of the same scene. In the context of this description, image noise is an unwanted signal which is present in an image resulting from the image capture process, and may be produced, for example, by a sensor and/or by circuitry of a camera which captures the image.

Since there is often little or no correlation between the image noise of two different images of the same scene, the image noise may be reduced by combining a sequence of two or more images captured in quick succession of the same scene. Combining the images will reduce the effect of random fluctuations in each individual image resulting from the image capture process. For example, at each pixel position, the pixel values for the different images may be averaged to determine the pixel values of the combined image. The combined image is a reduced noise image.

Since, the images which are combined are captured at different time instances there may be some motion of objects in the scene between the times at which different images are captured. Furthermore, there may be some movement of the camera between the times at which different images are captured. In particular, if a user is holding a camera while it captures a sequence of images then it is very likely that there will be some camera movement between the times at which different images are captured. The motion between the images which are combined to form the reduced noise image may cause some geometric misalignment between the images, which in turn may introduce some blur into the reduced noise image. There are various types of "alignment" between images, such as geometric alignment, radiometric alignment and temporal alignment. The description herein considers geometric alignment of images which is relevant for handling motion between the images, and the term "alignment" as used herein should be understood to be referring to "geometric alignment". Misalignment between the images causes problems when it comes to combining images in order to reduce noise. Furthermore, movement of the camera while an image is being captured may introduce motion blur into the image which can reduce the sharpness of the image.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of forming a reduced noise image using a set of images, the method comprising: applying respective transformations to at least some of the images of the set to bring them closer to alignment with a reference image from the set of images; determining measures of alignment of the respective transformed images with the reference image; determining weights for one or more of the transformed images using the determined measures of alignment; and combining a plurality of images including said one or more of the transformed images using the determined weights to form a reduced noise image.

There is provided a processing module for forming a reduced noise image using a set of images, the processing module comprising: alignment logic configured to: apply respective transformations to at least some of the images of the set to bring them closer to alignment with a reference image from the set of images; and determine measures of alignment of the respective transformed images with the reference image; and combining logic configured to: determine weights for one or more of the transformed images using the determined measures of alignment; and combine a plurality of images including said one or more of the transformed images using the determined weights to form a reduced noise image.

There is provided a method of transforming a first image to bring it closer to alignment with a second image, the method comprising: implementing a multiple kernel tracking technique to determine positions of a set of candidate regions of the first image based on a similarity between a set of target regions of the second image and the set of candidate regions of the first image, wherein the target regions of the second image are respectively positioned over the positions of a predetermined set of points of the second image; using at least some of the determined positions of the set of candidate regions to initialize a Lucas Kanade Inverse algorithm; using the Lucas Kanade Inverse algorithm to determine a set of points of the first image which correspond to at least some of the predetermined set of points of the second image; determining parameters of a transformation to be applied to the first image based on an error metric which is indicative of an error between a transformation of at least some of the determined set of points of the first image and the corresponding points of the predetermined set of points of the second image; and applying the transformation to the first image to bring it closer to alignment with the second image.

There is provided a processing module for transforming a first image to bring it closer to alignment with a second image, the processing module comprising alignment logic which comprises: multiple kernel tracking logic configured to implement a multiple kernel tracking technique to determine positions of a set of candidate regions of the first image based on a similarity between a set of target regions of the second image and the set of candidate regions of the first image, wherein the target regions of the second image are respectively positioned over the positions of a predetermined set of points of the second image; Lucas Kanade Inverse logic configured to use a Lucas Kanade Inverse algorithm to determine a set of points of the first image which correspond to at least some of the predetermined set of points of the second image, wherein the positions of at least some of the set of candidate regions determined by the multiple kernel tracking logic are used to initialize the Lucas Kanade Inverse algorithm; and transformation logic configured to: (i) determine parameters of a transformation to be applied to the first image based on an error metric which is indicative of an error between a transformation of at least some of the determined set of points of the first image and the corresponding points of the predetermined set of points of the second image, and (ii) apply the transformation to the first image to bring it closer to alignment with the second image.

There may also be provided computer readable code adapted to perform the steps of any of the methods described herein when the code is run on a computer. Furthermore, computer readable code may be provided for generating a processing module according to any of the examples described herein. The computer code may be encoded on a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
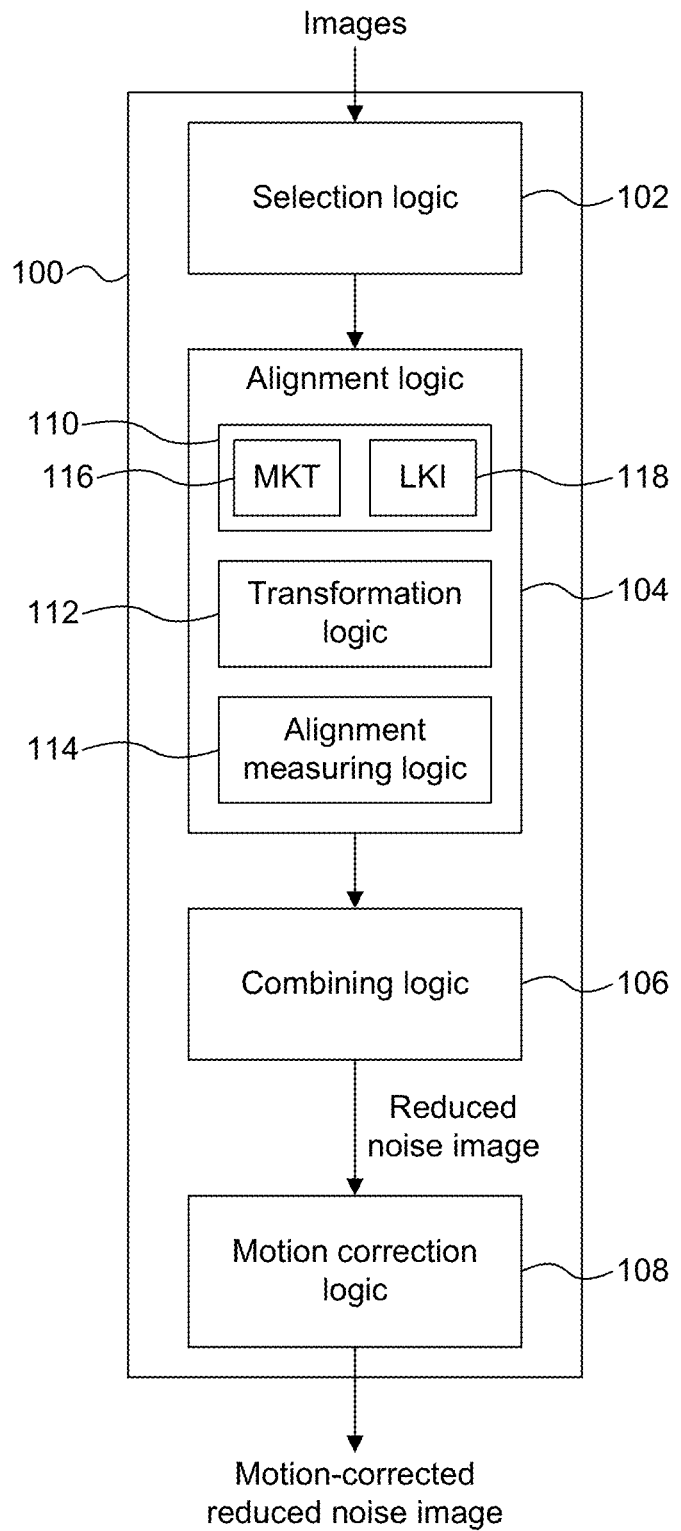
FIG. 1 is a schematic diagram of a processing module for forming a reduced noise image.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

In examples described herein, a reduced noise image is formed using a set of images. One of the images of the set may be selected to be a reference image and other images of the set are transformed such that they are better aligned with the reference image. At least some of the images can then be combined using weights which depend on the alignment of the transformed image with the reference image to thereby form the reduced noise image. By weighting the images according to their alignment with the reference image the effects of misalignment between the images in the combined image are reduced.

Furthermore, in examples described herein, point correspondences between a first image of a set of images and a second image (e.g. a reference image) of the set of images can be determined by implementing a multiple kernel tracking (MKT) technique to determine positions of a set of candidate regions of the first image, and using the determined positions to initialize a Lucas Kanade Inverse (LKI) algorithm. The LKI algorithm can then be used to determine a set of points of the first image which correspond to at least some of a predetermined set of points of the second image. These point correspondences can then be used to determine parameters of a transformation to be applied to the first image to bring it closer to alignment with the second image. It is noted that the MKT technique gives a global alignment which includes alignment parameters describing an alignment for the full image, and then this global alignment is used to determine the initial positions for use in the LKI algorithm which then obtains a local alignment to determine the point correspondences. As described in more detail below, the use of a multiple kernel tracking technique to initialize a Lucas Kanade Inverse algorithm solves some problems which can sometimes be encountered with a Lucas Kanade Inverse algorithm. For example, without a sufficiently accurate initialization, the Lucas Kanade Inverse algorithm may fail to converge on an accurate solution. The use of a multiple kernel tracking technique can provide a sufficiently accurate initialization for the Lucas Kanade Inverse algorithm even if the point correspondences involve a large shift in position and even if there are affine transformations, such as rotations, between the images. Furthermore, the Lucas Kanade Inverse algorithm does not perform well in flat areas of an image because the algorithm uses gradients to converge on a solution. A multiple kernel tracking technique includes the calculation of feature histograms which can be used to indicate whether a region is flat and should therefore be discarded such that it is not used when implementing the Lucas Kanade Inverse algorithm.

In more detail, in examples described herein, the candidate images (i.e. the images other than the reference image) are warped back to the reference image using the MKT parameters, such that any region from a candidate image should be close to the corresponding region of the reference image. The LKI algorithm can then use the same regions that were used when performing the MKT, because some information is already computed for them (e.g. as described below, an intensity histogram may be computed for a region which can be used to determine if the region is flat or not). The MKT technique can include scaling and rotation functions, so warping the full candidate image back to the reference image can have some accuracy advantages, since the LKI algorithm described herein does not include scaling or rotation functions. The LKI algorithm described herein does not include scaling or rotation functions because it operates on small regions, so allowing scaling and rotations would introduce too many degrees of freedom for the small region thereby resulting in errors. So, the use of the MKT technique takes scaling and rotation into account, such that the LKI algorithm does not need to, and the method still has tolerance to rotations and scaling. It is noted that the point correspondences obtained by the LKI algorithm provide projective transformations which may include scaling and rotation. Projective transformations are not estimated on the MKT step in the examples described herein because the MKT technique would become unstable due to too many degrees of freedom. The MKT technique described herein has four degrees of freedom (x, y, scale, angle) and a projective transformation has eight degrees of freedom.

Embodiments will now be described by way of example only.

FIG. 1 shows a processing module 100 which is configured to receive a set of images and to form a reduced noise image using the set of images. Furthermore, in the example shown in FIG. 1, the processing module 100 is configured to apply motion correction such that the image which is output from the processing module 100 is a motion-corrected, reduced noise image. The processing module 100 comprises selection logic 102, alignment logic 104, combining logic 106 and motion correction logic 108. The alignment logic 104 comprises point correspondence logic 110, transformation logic 112 and alignment measuring logic 114. The point correspondence logic 110 comprises multiple kernel tracking logic 116 and Lucas Kanade Inverse logic 118. The processing module 100, and its logic blocks, may be implemented in hardware, software or a combination thereof.

Figure 2:
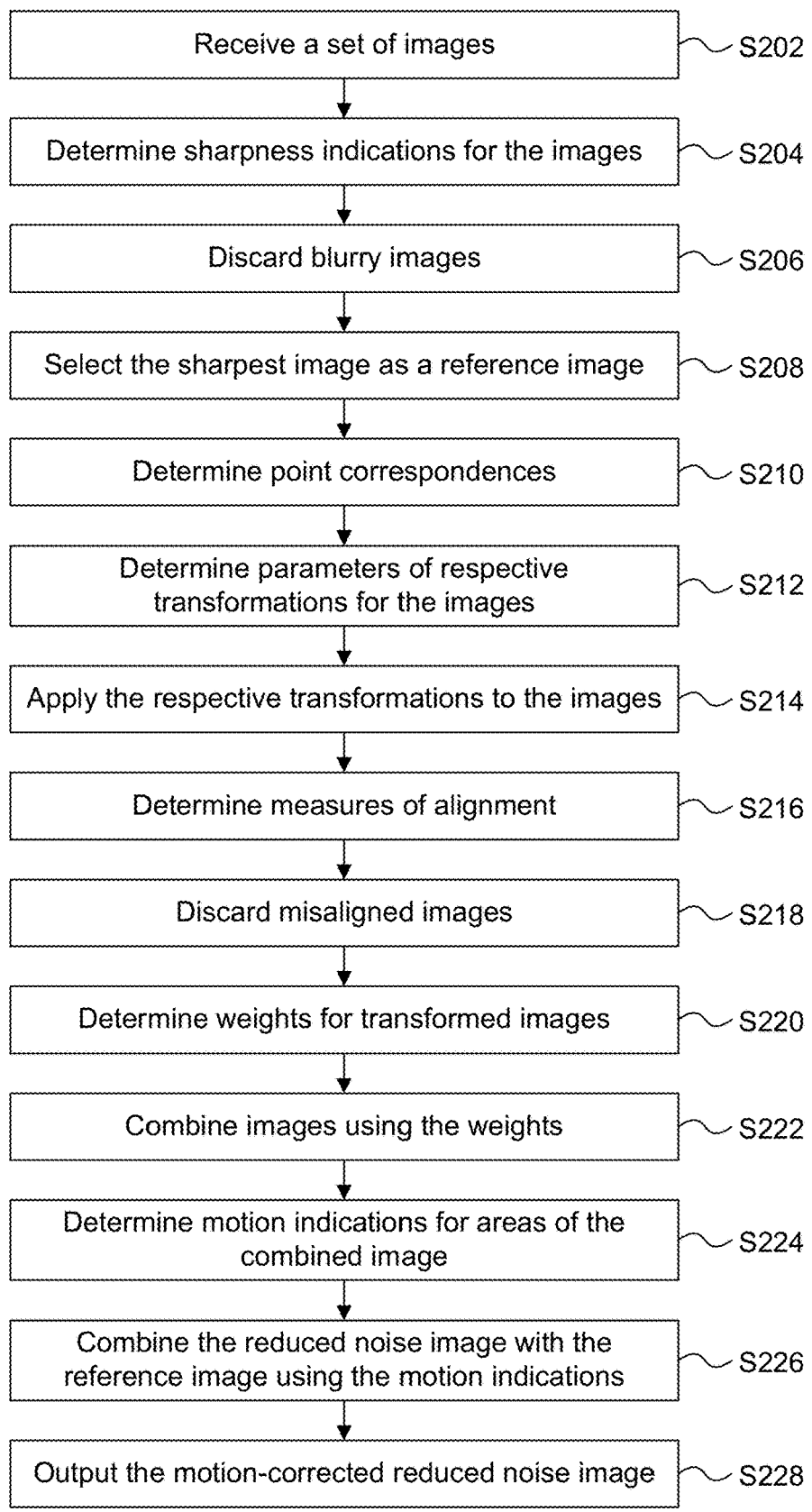
FIG. 2 is a flow chart of a method of forming a reduced noise image.

The operation of the processing module 100 is described with reference to the flow chart shown in FIG. 2. In step S202 the processing module 100 receives a set of images. To give some examples, the images may be received from an image sensor, from some other processing module or from a memory which may be implemented on the same device (e.g. camera, smartphone, tablet, etc.) as the processing module 100. The images of the set of images are similar in the sense that they are substantially of the same scene. For example, the set of images may be captured in quick succession, e.g. with a camera operating in a burst mode such that a plurality of images (e.g. 24 images) are captured over a short time period (e.g. 3 seconds). The numbers given herein are given by way of example and may be different in different implementations. The set of images may comprise frames of a video sequence. The set of images are received at the selection logic 102.

As a very brief overview of the noise reduction method implemented by the processing module 100:
 the selection logic 102 selects a reference image from the set of images based on the sharpness of the images, and discards blurry images (steps S204 to S208);
 the alignment logic 104 transforms images such that they more closely align with the reference image, and discards those which are highly misaligned (steps S210 to S218);
 the combining logic 106 combines images to form a reduced noise image (steps S220 and S222); and
 the motion correction logic 108 corrects artifacts in the reduced noise image which are produced by motion between the images (steps S224 and S226).

These processes are described in more detail below.

In step S204 the selection logic 102 determines sharpness indications for the images. It is noted that a camera capturing the images may be implemented in a handheld device and, as such, some of the images may be blurry due to motion of the camera. Blur caused by motion of the camera is not normally a desired effect. Therefore, in step S206, if the determined sharpness indication for an image is below a sharpness threshold then the image is discarded.

As an example, the sharpness indications may be sums of absolute values of image Laplacian estimates for the respective images. The image Laplacian is a good indicator of the presence of high frequencies in an image, and a blurry image usually has less high frequency energy. The Laplacian, $L(I_i(x, y))$, at a pixel position $(x, y)$ of the image $I_i$, is the $2^{nd}$ derivative of the image at that pixel position and is given by the equation:

$$L(I_i(x, y)) = \frac{\partial^2 I_i}{\partial^2 x} + \frac{\partial^2 I_i}{\partial^2 y},$$

where $I_i(x, y)$ is the image pixel value at the location $(x, y)$ and $L$ is the Laplacian operator.

Computing the Laplacian is a simpler operation than computing the magnitude of the gradients. The second derivatives (which are calculated for the Laplacian) are more sensitive to noise than the magnitude of the gradients, so in some examples the magnitude of the gradients may be used to determine the sharpness indications, but in the examples described in detail herein the Laplacian is used due to its simplicity and an assumption can be made that the noise will be approximately the same for each image. For example, the Laplacian may be estimated by filtering the image with a suitable filter.

The sharpness indication for an image, i, is denoted $\varphi_i$, and is the sum of the absolute values of the image Laplacian over all of the pixel positions of the image, such that:

$$\varphi_i = \Sigma_{xy} |L(I_i(x,y))|,$$

The sharpness indication of an image is a measure of the sharpness (or conversely the blurriness) of the image. The sharpness threshold may be determined using the mean, $\mu(\varphi)$, and standard deviation, $\sigma(\varphi)$, of the set of sharpness indications, $\varphi$, for the set of images, where $\varphi=\{\varphi_1, \ldots, \varphi_N\}$ for a set of N images. For example, the threshold may be set at $\mu(\varphi)-\varepsilon_1\sigma(\varphi)$ (where as an example $\varepsilon_1$ may be in the range $1.1 \leq \varepsilon_1 \leq 1.4$), wherein an image is discarded if its sharpness indication is below this threshold. That is, the image, i, is discarded in step S206 if:

$$\varphi_i < \mu(\varphi) - \varepsilon_1 \sigma(\varphi).$$

Figure 3:
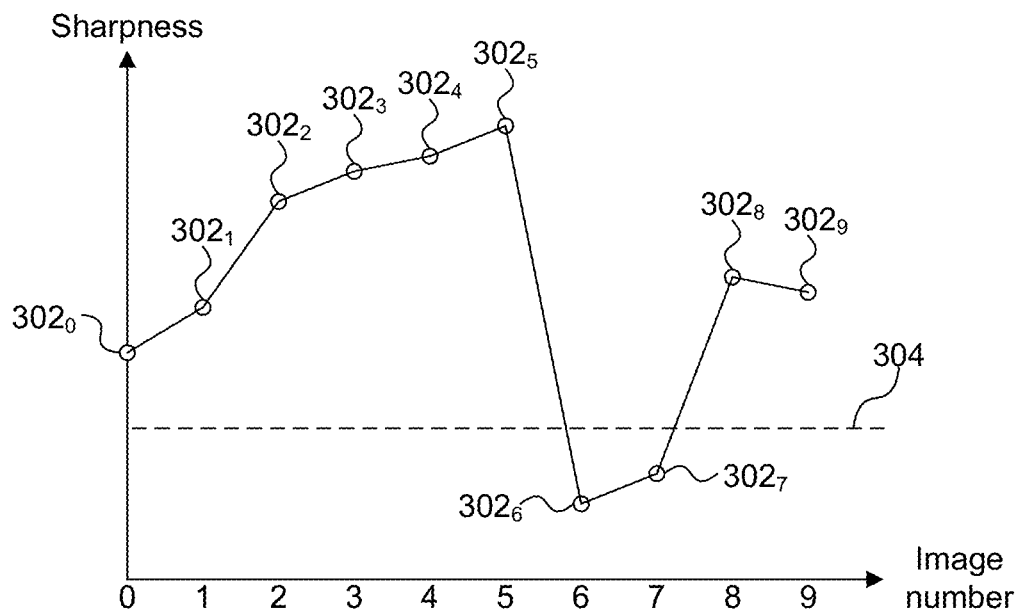
FIG. 3 is a graph showing the values of sharpness indications for a set of images.

As an example, FIG. 3 shows a graph of sharpness indications $302_i$ for a set of ten images (i=0 . . . 9). In this example, the sharpness threshold is shown by the dashed line 304. Images 6 and 7 have sharpness indications $302_6$ and $302_7$ which are below the sharpness threshold 304. Therefore images 6 and 7 are discarded in step S206 because they are determined to be too blurry. The sharpness indications 302 of the other images are above the sharpness threshold 304 and as such those other images are not discarded in step S206. It is noted that in some other examples step S206 might not be performed. That is, in some examples, images are not discarded based on their sharpness. This may help to simplify the process, but may result in more blurriness appearing in the final image.

In step S208, based on the sharpness indications 302, the selection logic 102 selects the sharpest image from the set of images to be the reference image. Therefore, in the example shown in FIG. 3, image 5 is selected to be the reference image because its sharpness indication $302_5$ is higher than the sharpness indications 302 of the other images in the set of ten images. Selecting the sharpest image as the reference image is beneficial to the rest of the method described below. For example, it is easier to determine alignment to a sharp image than to determine alignment to a blurry image. In other examples, a reference image could be selected using different criteria, e.g. a combination of different criteria. For example, a reference image could be selected based on the content of the images, e.g. the image from the set of images in which the greatest number of people are smiling or in which the greatest number of people have their eyes open and/or are looking at the camera may be selected as the reference image. In general, the "best" image may be selected as the reference image, but the criteria which determine which image is considered to be the best may be different in different examples.

The images which have not been discarded (e.g. images 0 to 5 and 8 and 9 in the example shown in FIG. 3) are passed from the selection logic 102 to the alignment logic 104. In steps S210 to S214 the alignment logic 104 determines and applies a respective transformation to each of the images (other than the reference image and the images discarded by the selection logic 102) to bring them closer to alignment with the reference image. In the examples described below, the transformation for an image, $I_i$, is represented as a homography, $H_i$. The homography $H_i$ is a matrix which is determined with the aim of satisfying the equation:

$$x_i = H_i x_r,$$

where $x_i$ is a set of points of the image $I_i$ and $x_r$ is a corresponding set of points of the reference image $I_r$. So in order to determine the parameters of the transformation (i.e. the components of the homography matrix $H_i$) point correspondences are first determined, i.e. it is determined which points of the image $I_i$ correspond to at least some of the set of points $x_r$ of the reference image $I_r$. The set of points $x_r$ of the reference image $I_r$ is a predetermined set of points, and may for example comprise points of a uniform lattice.

Therefore, in step S210, the point correspondence logic 110 determines, for each of the images to which a transformation is to be applied, a set of points $x_i$ which correspond to the predetermined set of points $x_r$ of the reference image $I_r$. In the example described herein, the set of points $x_i$ is determined using the Lucas Kanade Inverse (LKI) algorithm. Furthermore, the LKI algorithm is initialized using the results of a multiple kernel tracking (MKT) technique.

Figure 4:
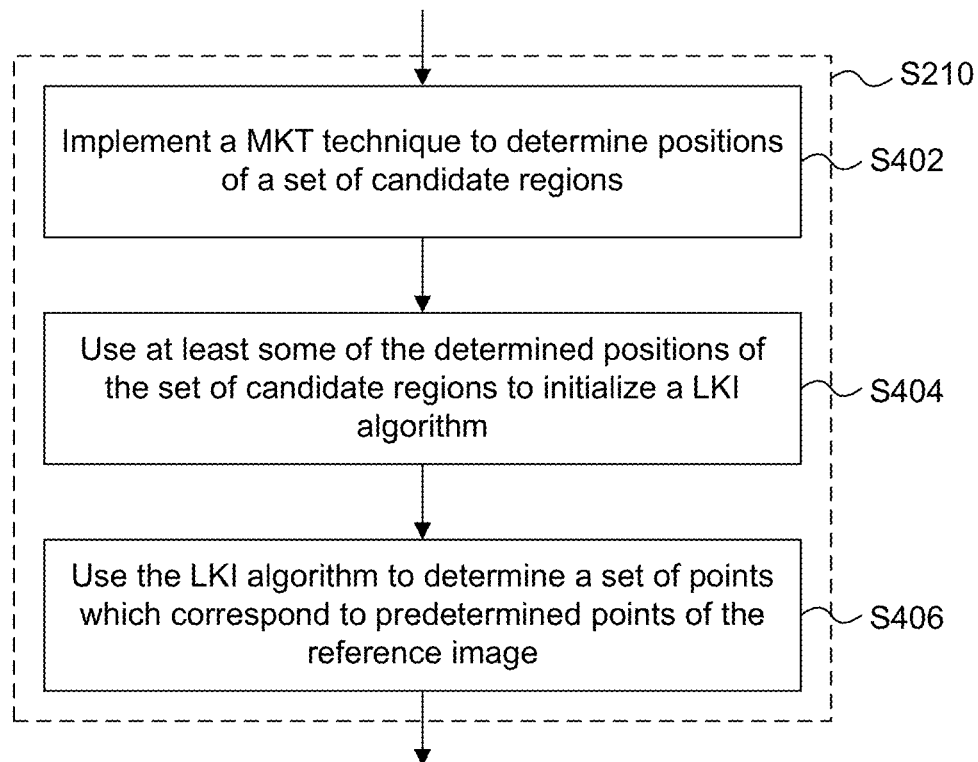
FIG. 4 is a flow chart of a method of determining point correspondences between two images.

Details of step S210 are shown in the flow chart of FIG. 4. In particular, step S210 includes steps S402, S404 and S406. In step S402 the MKT logic 116 implements a MKT technique to determine positions of a set of candidate regions of the image $I_i$ based on a similarity between a set of target regions of the reference image $I_r$ and the set of candidate regions of the image $I_i$.

Figure 5:
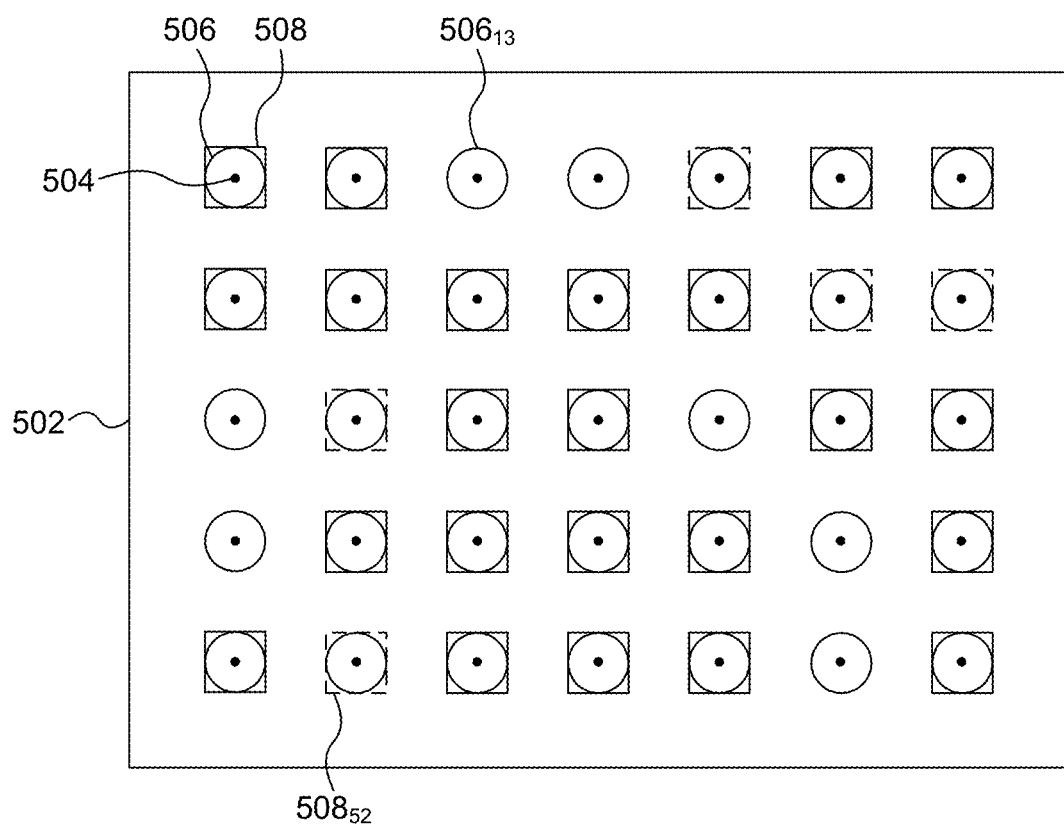
FIG. 5 shows a set of regions within an image used for a multiple kernel tracking technique and a corresponding set of regions within the image used for a Lucas Kanade Inverse algorithm.

FIG. 5 represents an image $I_i$, denoted 502. The positions of the predetermined set of points of the reference image create a uniform lattice over at least part of the image 502, and FIG. 5 shows these points (one of which is denoted with reference numeral 504). In this example the lattice is a 5×7 lattice of points 504 but in other examples a different arrangement of predetermined points may be used, e.g. a 10×10 lattice. The circles 506 shown in FIG. 5 represent the candidate regions for which the positions are determined by the MKT logic 116 in step S402. The squares 508 shown in FIG. 5 represent candidate regions used by the LKI algorithm as described below.

In the MKT technique, the candidate regions 506 are compared to target regions of the reference image $I_r$. The circles 506 in FIG. 5 are merely illustrative, and the regions could have any suitable shape, e.g. the target regions may be blocks of 31×31 pixels of the reference image, positioned over (e.g. centred on) the positions of the points 504 from the predetermined set of points of the reference image $I_r$.

Multiple kernel tracking techniques are known in the art, for example as described in "Multiple kernel tracking with SSD" by Hager, Dewan and Stewart, IEEE Conference on Computer Vision and Pattern Recognition, 2004, pp 790-679. As such, for conciseness, an in depth explanation of a multiple kernel tracking technique is not provided herein. However, as a higher-level explanation, a MKT technique represents each of the target regions of the reference image $I_r$ with a kernel-weighted histogram q, e.g. of the pixel intensity values contained in the target region. The histogram q comprises a plurality of histogram bins, i.e. $q=(q_1, q_2, \ldots, q_m)^T$, where m is the number of bins in the histogram. The bins of the histogram are weighted with a kernel function centred at position c in the reference image $I_r$ which corresponds to the position of one of the predetermined set of points 504. In the same way for a candidate region 506 of the image $I_i$, a kernel-weighted histogram p(c') is determined with the kernel function centred at position c' in the image $I_i$. It is assumed that the position c' is close to the position c, and the difference between c and c' can be expressed as $\Delta c = c' - c$. A similarity function between the two histograms q(c) and p(c') can be used to find a value for $\Delta c$ which provides an improved correspondence between the target region of the reference image $I_r$ and the candidate region 506 of the image $I_i$. This method can be iterated until the value of $\Delta c$ falls below a threshold or until a maximum number of iterations have been performed. This idea can be expanded to multiple kernels such that a transformation $\Delta C$ can be found which provides a good correspondence for tracking multiple target regions of the reference image $I_r$ to the candidate regions 506 of the image $I_L$. With single kernel tracking, $\Delta c$ can be found as a translation, i.e. $\Delta c = (\Delta c_x, \Delta c_y)$; but with multiple kernel tracking, $\Delta C$ can be found as a more complex transformation, e.g. an affine transformation which includes rotations ($\theta$) and/or scaling ($\lambda$) functions, i.e. $\Delta C = (\Delta c_x, \Delta c_y, \theta, \lambda)$. Therefore, in summary, the MKT logic 116 implements the MKT technique by iteratively optimizing the similarity between feature histograms (e.g. intensity histograms) of the set of target regions of the reference image and corresponding feature histograms of the set of candidate regions by iteratively varying the positions of the candidate regions.

Some of the candidate regions 506 of the image $I_i$ may be rejected if they are determined to be too flat for the LKI algorithm to work with. The LKI algorithm relies on gradients in order to converge to a solution, so if image regions are flat the LKI algorithm does not always provide good results. The MKT technique can provide a simple way of determining whether a region is flat, such that a point in a flat region can be rejected, such that it is not used by the LKI logic 118. For example, a counter (or "weight") for a region can be used as an indication as to whether the region is flat. Reading the histogram from left to right, if a bin is not zero its weight is incremented. If, in addition, the bin to the left of the current bin is zero then the weight of the current bin is incremented by another 1. If the sum of all the weights is greater than 3 then the region is used for tracking in the LKI algorithm. Otherwise the region is discarded because it is determined to be flat. If the weight is lower than 4 it means that the patch has constant colour, so that, it has a high probability of being a flat region. The reasoning for this is that if a region of the image has constant colour (i.e. it is a flat region), this leads to a histogram with a single non-zero bin, because all the pixels have the same value. A flat region can be altered by noise and the quantization of its values (when generating the histogram) which can lead to histograms with two consecutive non-zero bins for flat regions. For a region to be considered non-flat, its histogram should have at least two non-consecutive non-zero bins (so the colours in the region are more different than colours altered by noise) or three consecutive non-zero bins. The algorithm of this methodology can be seen below:

```
weight = 0
for each bin 'i' in the histogram
    if the bin(i)   != 0 then
        weight = weight + 1
        if the bin(i-1) == 0 then weight = weight + 1
    enf for
    if weight > 3 then use the point to track
```

FIG. 5 shows the regions which are not determined to be too flat as squares, e.g. square 508. Some of the regions which are determined by the MKT logic 116 are not provided to the LKI logic 118 because they are too flat and as such FIG. 5 shows that some regions (e.g. region $506_{13}$) do not have an associated square meaning that they are not used by the LKI logic 118.

In step S404 the LKI logic 118 uses the positions of at least some of the set of candidate regions determined by the MKT technique to initialize the LKI algorithm. The LKI algorithm is known in the art, for example as described in "Lucas-Kanade 20 Years On: A Unifying Framework" by Simon Baker and Iain Matthews, International Journal of Computer Vision, 2004, pp 221-255.

In step S406 the LKI logic 118 uses the LKI algorithm to determine a set of points of the image $I_i$ which correspond to at least some of the points of the predetermined set of points of the reference image $I_r$. Since the LKI algorithm is known in the art, for conciseness, an in depth explanation of the LKI algorithm is not provided herein. However, as a higher-level explanation, the LKI algorithm aims to minimise the sum of squared error between two image patches: a first patch being a target region of the reference image $I_r$, and the second patch being a candidate region of the image $I_i$ which is warped back onto the coordinates of the reference image. The sum of squared error between the two image patches is minimised by varying the warping parameter p (i.e. changing p to p+Δp) to find a value for Δp which minimises the sum of squared error. According to the LKI algorithm this is done iteratively until the value of Δp is below a threshold or until a maximum number of iterations have been performed. The final value of the warping parameter p after the LKI algorithm has been performed is used to determine the positions of a set of points in the image $I_i$ which correspond to at least some of the predetermined set of points of the reference image $I_r$.

A problem which the LKI algorithm can sometimes encounter is related to the image gradients in the reference image $I_r$. When a gradient in one direction dominates the gradient in the perpendicular direction (e.g. when the gradient on the x axis $\nabla_x I$ dominates the gradient on the y axis $\nabla_y I$, or vice-versa), the results of the LKI algorithm may be erroneous. However, as can be seen in the more detailed description of the LKI algorithm provided below, for each of the points of the set of points of the image $I_i$ which aren't determined to be too flat, the LKI algorithm includes determining a warped version of an image patch surrounding the point, and determining a Hessian matrix for the image patch. The elements of the Hessian matrix indicate sums of squared values of the gradients in different directions across the warped version of the image patch. The problem of gradients in one direction dominating gradients in another direction can be addressed by comparing the sum of the squared values of the gradients on x and y axes. If the sum of the squared values of the gradients for a region in one direction is at least 20 times bigger than in the perpendicular direction then the region is discarded. By discarding a region in this way, the LKI logic 118 will not output a point correspondence for the discarded region. It is noted that this comparison does not significantly add to the computation performed by the point correspondence logic 110 because the sum of the squared values of the gradients can be extracted from the Hessian matrix (which is computed as part of the LKI algorithm). The Hessian is referred to as "ill-conditioned" when the ratio between the two gradients is large (e.g. 20).

FIG. 5 shows regions which have ill-conditioned Hessians with squares having dashed lines, such as region $508_{52}$. The point correspondences determined by the point correspondence logic 110 are provided to the transformation logic 112. In the example shown in FIG. 5 there are 35 regions determined by the MKT logic 116 surrounding the respective 35 predetermined points 504. Seven of those regions are flat (and do not have corresponding squares shown in FIG. 5) and as such the MKT logic 116 discards them. Of the remaining 28 regions, the LKI logic 118 determines that five of them have ill conditioned Hessians (and have squares shown with dashed lines in FIG. 5) and as such the LKI logic 118 discards them. Therefore the point correspondences are determined for the remaining 23 regions (i.e. those regions shown with solid line squares in FIG. 5) and the point correspondences for these regions are provided to the transformation logic 112.

In step S212 the transformation logic 112 determines parameters of a transformation to be applied to the image $I_i$ based on an error metric which is indicative of an error between a transformation of the set of points received from the point correspondence logic 110 and the corresponding points of the set of predetermined set of points of the reference image $I_r$.

For example, the transformation for image $I_i$ is a homography which is described by a matrix $H_i$ which can be used to more closely align the pixel positions of the image $I_i$ with the corresponding pixel positions of the reference image $I_r$. As an example, the homography may be restricted to be a 2D projective transformation. This provides a good trade-off between flexibility and simplicity of the alignment estimation. The step of determining parameters of the transformation may comprise determining the elements of the homography matrix, $H_i$, such that:

$$x_i = H_i x_r,$$

where $x_i$ is the set of points of the image $I_i$ which correspond to the points $x_r$ of the reference image, as determined by the point correspondence logic 110.

Step S212 comprises optimizing the elements of the homography matrix, $H_i$, by computing the Minimum Mean Squared Error (MMSE) over the two sets of points, $x_i$ and $x_r$. This comprises finding values for the elements of the matrix $H_i$ which provide the minimum mean squared error for the set of points, e.g. by solving the equation:

$$\begin{pmatrix} 0 & 0 & 0 & -x_r^j & -y_r^j & 1 & x_r^j y_i^j & y_r^j y_i^j \\ x_r^j & y_r^j & 1 & 0 & 0 & 0 & -x_r^j x_i^j & -y_r^j x_i^j \end{pmatrix} \begin{pmatrix} h_1 \\ h_2 \\ h_3 \\ h_4 \\ h_5 \\ h_6 \\ h_7 \\ h_8 \end{pmatrix} = \begin{pmatrix} -y_i^j \\ x_i^j \end{pmatrix},$$

for j=0 to N where N is the number of points for which correspondences are determined. It is noted that N is at least four so that a solution can be found for $H_i$ and in the example described above with reference to FIG. 5, N=23. Usually, increasing N would increase the accuracy of the values determined for the matrix $H_i$. To arrive at the equation above, it is noted that $$H_i = \begin{pmatrix} h_1 & h_2 & h_3 \\ h_4 & h_5 & h_6 \\ h_7 & h_8 & 1 \end{pmatrix}, x_r^j = (x_r^j, y_r^j)$$

for the $j^{th}$ point of the reference image $I_r$ and $x_i^j = (x_i^j, y_i^j)$ for the $j^{th}$ point of the image $I_i$.

In other examples, other error metrics (other than the MMSE) may be used to find a solution for the matrix $H_i$.

In step S214 the transformation logic 112 applies the transformation to the image $I_i$ to bring it closer to alignment with the reference image $I_r$. The alignment logic 104 performs steps S210 to S214 for each of the images that are received from the selection logic 102 except for the reference image (there is no need to transform the reference image), such that a respective transformation is applied to the different images.

Steps S210, S212 and S214 could be implemented as a stand-alone method for transforming a first image (e.g. an image $I_i$) to bring it closer to alignment with a second image (e.g. the reference image $I_r$). These steps are described herein in the context of part of the noise reduction method shown in FIG. 2, but they could be used in other scenarios in which it would be useful to transform a first image such that it more closely aligns with a second image.

Even though the images have been transformed, there may still exist some misalignment between the images and the reference image. Misalignment between the images may be detrimental when the images are combined. Therefore if a transformed image is significantly misaligned with the reference image then that transformed image may be discarded by the alignment logic 104, as described below in steps S216 and S218.

In step S216 the alignment measuring logic 114 determines measures of alignment of the respective transformed images with the reference image. The transformed images are denoted $W_i$. As an example, the measure of alignment of a transformed image $W_i$ is a misalignment parameter $\tau_i$, which may for example be determined as the sum (over all of the pixel positions (x, y) of the image) of the absolute differences between the transformed image $W_i$ (x, y) and the reference image $I_r$(x, y). That is:

$\tau_i = \tau_{xy} |W_i(x,y) - I_r(x,y)|.$

In step S218 the alignment measuring logic 114 determines, for each of the transformed images, whether the respective measure of alignment indicates that the alignment of the transformed image $W_i$ with the reference image $I_r$ is below a threshold alignment level. In dependence thereon, the alignment measuring logic 114 selectively discards images which are determined to be misaligned. Images which are discarded are not provided from the alignment logic 104 to the combining logic 106. In the example in which the measure of alignment of an image $I_i$ is a misalignment parameter $\tau_i$, an image may be discarded if the misalignment parameter $\tau_i$ is above a threshold. As an example, the threshold may depend on the mean of the misalignment parameters, $\mu(\tau)$, for the different images and on the standard deviation of the misalignment parameters, $\sigma(t)$, for the different images, where $\tau$ represents all of the misalignment parameters for the different images, i.e. $\tau = \{\tau_1, \ldots, \tau_N\}$, where N is the number of different images for which a misalignment parameter is determined. For example, the threshold may be $\mu(\tau) + \varepsilon_2 \sigma(\tau)$ (where as an example $\varepsilon_2$ may be in the range $1.2 \leq \varepsilon_2 \leq 1.5$). A hugely misaligned image may adversely affect the threshold, so in another example, rather than using a threshold to discard misaligned images, a predetermined number of the best aligned images (i.e. those images with the lowest misalignment parameters $\tau_i$) may be selected for use, and the other images may be discarded.

Figure 6:
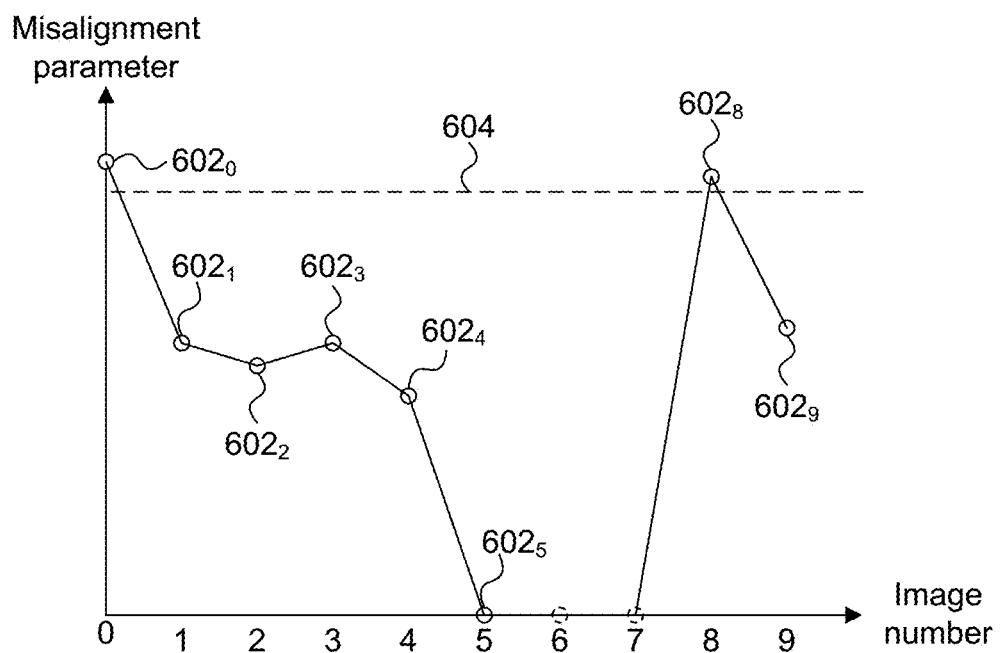
FIG. 6 is a graph showing the values of misalignment parameters for a set of images.

As an example, FIG. 6 shows a graph of the misalignment parameters 602 for a set of images. The images 6 and 7 were discarded by the selection logic 102 because they were too blurry and so misalignment parameters are not calculated for those images. Image number 5 is the reference image and as such its misalignment parameter is zero. The dashed line 604 represents the misalignment threshold (e.g. set at $\mu(\tau) + \varepsilon_2 \sigma(\tau)$). It can be seen in this example that the misalignment parameters for images 0 and 8 are above the misalignment threshold 604, whereas the misalignment parameters for images 1 to 4 and 9 are below the misalignment threshold 604.

In step S218 the alignment measuring logic 114 discards misaligned images, i.e. images for which the misalignment parameter is above the misalignment threshold. This corresponds to discarding images if their measures of alignment are below a threshold alignment level.

Therefore, in the example described above, in step S218 an image $I_i$ with a misalignment parameter $\tau_i$ is discarded if $\tau_i > \mu(\tau) + \varepsilon_2 \sigma(\tau)$. It is noted that in some other examples step S218 might not be performed. That is, in some examples, images are not discarded based on their alignment with the reference image. This may help to simplify the process, but may result in misalignment artefacts appearing in the final image.

Images which pass the alignment test are passed from the alignment logic 104 to the combining logic 106. Conversely, images which are discarded by the alignment logic 104 are not passed from the alignment logic 104 to the combining logic 106.

The combining logic 106 operates to combine the transformed images it receives from the alignment logic 104. In order to do this, in step S220 the combining logic 106 determines weights for the transformed images using the measures of alignment determined by the alignment measuring logic 114. Then in step S222 the combining logic 106 combines a plurality of images including the transformed images received from the alignment logic 104 using the determined weights to form a reduced noise image. The plurality of images which are combined in step S222 may or may not include the reference image. In preferred examples described herein the plurality of images which are combined in step S222 includes the reference image, which is the sharpest of the images. In other examples, e.g. if the reference image is selected differently, e.g. as the temporally middle image, then it may be beneficial to leave the reference image out of the group of images which are combined in step S222, e.g. if the reference image is particularly blurry. Selecting the temporally middle image as the reference image may sometimes be a suitable choice since it is likely that, on average, the images will be closer to alignment with the temporally middle image than to a different image.

Furthermore, selecting the temporally middle image as the reference image would avoid the processing needed to determine the sharpness of the images in order to select the reference image. In these examples, the other images are aligned to the reference image and then some of the aligned images (which might not include the reference image) are combined to form the reduced noise image in step S222.

As an example, the images may be combined using a bilateral filter with weights for each pixel of each image defined in dependence on the misalignment parameter of the image, $\tau_i$, and the difference in pixel value between the pixel of the image and the corresponding pixel of the reference image. The resultant image is the accumulation of the transformed images after weighting each pixel with the appropriate weight. For example, the images may be ordered depending on their alignment with the reference image, e.g. by ordering the images using the misalignment parameters to form an ordered set of images. An index value, i, indicates the position of an image in the ordered set. A low index value, i, is given to a highly aligned image (i.e. an image with a low misalignment parameter, $\tau_i$), whereas a higher index value, i, is given to a less aligned image (i.e. an image with a higher misalignment parameter, $\tau_i$). For example, if there are N images, an index value of i=1 is given to the best aligned image (i.e. the image with the lowest misalignment parameter, $\tau_i$), and an index value of i=N is given to the worst aligned image (i.e. the image with the highest misalignment parameter, $\tau_i$). For example, a transformed image $W_i$ has red, green and blue pixel values at a pixel position (x, y), denoted respectively as $W_i^R(x, y)$, $W_i^G(x, y)$ and $W_i^B(x, y)$. Similarly, the reference image $I_r$ has red, green and blue pixel values at a pixel position (x, y), denoted respectively as $I_r^R(x, y)$, $I_r^G(x, y)$ and $I_r^B(x, y)$. As an example, the weight, $\omega_i(x, y)$, for a pixel at position (x, y) of the transformed image $W_i$ is determined according to the equation:

$$\omega_i(x, y) = \frac{1}{\sum_j \omega_j(x, y)} e^{-\frac{i^2}{2\sigma_\tau^2}} e^{-\frac{(W_i^R(x,y)-I_r^R(x,y))^2 + (W_i^G(x,y)-I_r^G(x,y))^2 + (W_i^B(x,y)-I_r^B(x,y))^2}{2\sigma_{diff}^2}}$$

where $\sigma_\tau$ is the standard deviation used to define the 0 mean Gaussian of the misalignment weighting (this is a parameter that can be tuned, and as an example may be equal to 6); and $\tau_{diff}$ is the standard deviation used to define the 0 mean Gaussian of the pixel difference (this is a parameter that can also be tuned, and as an example may be equal to 20). The factor of $$\frac{1}{\sum_j \omega_j(x, y)}$$

is a normalization factor which means that for each pixel position (x, y) the weights of the different images sum to one.

It can be appreciated that since the weights depend upon the alignment of the image with the reference image, the resulting combined pixel values are weighted in favour of images which are closely aligned with the reference image. This reduces artifacts which may occur due to misalignment between the images which are combined.

The reduced noise image (which is denoted S' herein) is output from the combining logic 106. In some examples, this could be the end of the noise reduction process and the reduced noise image could be provided as the output of the processing module 100. However, in other examples, some motion correction may be applied to the reduced noise image before it is outputted from the processing module 100. Motion correction may be beneficial because when the captured scene has regions with motion then the combined image S' may contain artifacts due to the motion in the scene (and/or motion of the camera) between the times at which different ones of the combined images are captured.

As an example, the reduced noise image output from the combining logic 106 may be received by the motion correction logic 108, and in step S224 the motion correction logic 108 determines motion indications indicating levels of motion for areas of the reduced noise image, S'. In examples described herein, this is done by first determining a "background image", B, which has pixel values corresponding to an average (e.g. mean or median) of the corresponding pixel values of the transformed images $W_i$ and optionally the reference image determined pixel by pixel. The background image, B, may be a downscaled version of the images. For example, the original images may comprise 1440×1080 pixels and the downscaled background image may comprise 256×192 pixels. These numbers are just given by way of example. Downscaling processes are known in the art to convert images between different resolutions or aspect ratios, etc. Downscaling the background image reduces the number of pixels in the background image and therefore reduces the amount of computation that is performed on the background image, without significantly affecting the result of the motion correction.

Figure 7A:
FIG. 7a shows an example of an average of a set of images when there is motion in the scene.

FIG. 7a shows an example of a background image 702. There is some motion in the scene between the times at which the different images are captured and, as such, parts of the background image 702 are blurred.

A binary motion mask can then be determined which indicates for each pixel of the background image whether or not there is motion. For example, the binary value of the motion mask mask(x, y) at the pixel position (x, y) can be determined according to the equation:

mask(x,y)=|$I_r^R(x,y)-B^R(x,y)$|>λ∨|$I_r^G(x,y)-B^G(x,y)$|>λ∨|$I_r^B(x,y)-B^B(x,y)$|>λ where $B^R(x, y)$, $B^G(x, y)$ and $B^B(x, y)$ are the red green and blue components of the background image at pixel position (x, y), λ is a threshold parameter which may for example be set to 8, and ∨ is an OR operator. So if any of the colour components of the background image differ from the corresponding colour components of the reference image by more than the threshold parameter then the mask(x, y) value is set to 1 to indicate that there is motion at the pixel position (x, y), otherwise the mask(x, y) value is set to 0 to indicate that there is not motion at the pixel position (x, y).

Figure 7B:
FIG. 7b shows a binary motion mask indicating areas of motion in the set of images.

FIG. 7b shows the motion mask 704 for the background image shown in FIG. 7a. In FIG. 7b a pixel is white if the motion mask at that position indicates that there is motion in the background image (e.g. if mask(x, y)=1), and a pixel is black if the motion mask at that position indicates that there is not motion in the background image (e.g. if mask(x, y)=0)

It can be seen in FIG. 7b that the binary motion mask includes a lot of small regions which appear to be indicative of motion but when compared to the image 702 it can be seen that these small regions often do not relate to significant motion in the scene. Therefore, the binary motion mask may be cleaned using a set of morphological operations, e.g. consisting of two erosion operations followed by two dilatation operations.

Figure 7C:
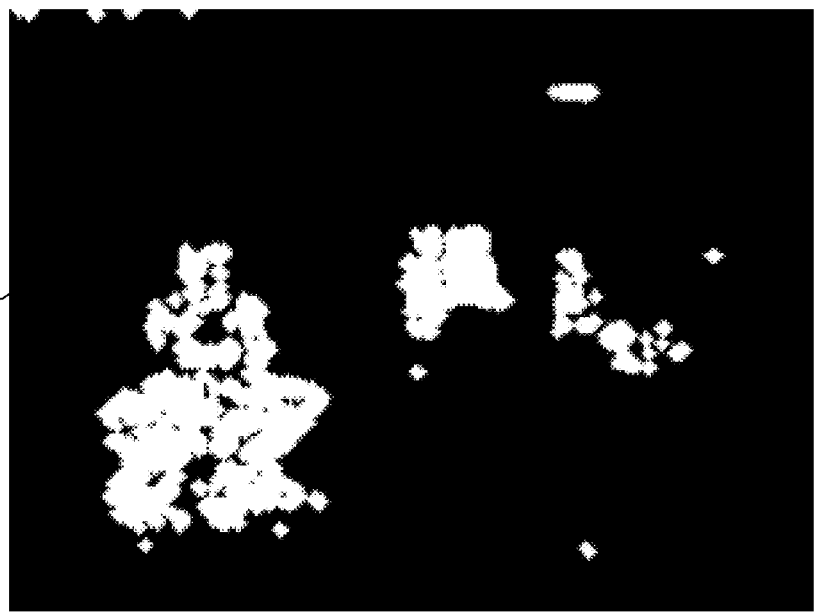
FIG. 7c shows a modified motion mask.

The cleaned motion mask 706 is shown in FIG. 7c. It can be appreciated that the white areas in FIG. 7c correspond closely to areas of motion in the image 702.

Figure 7D:
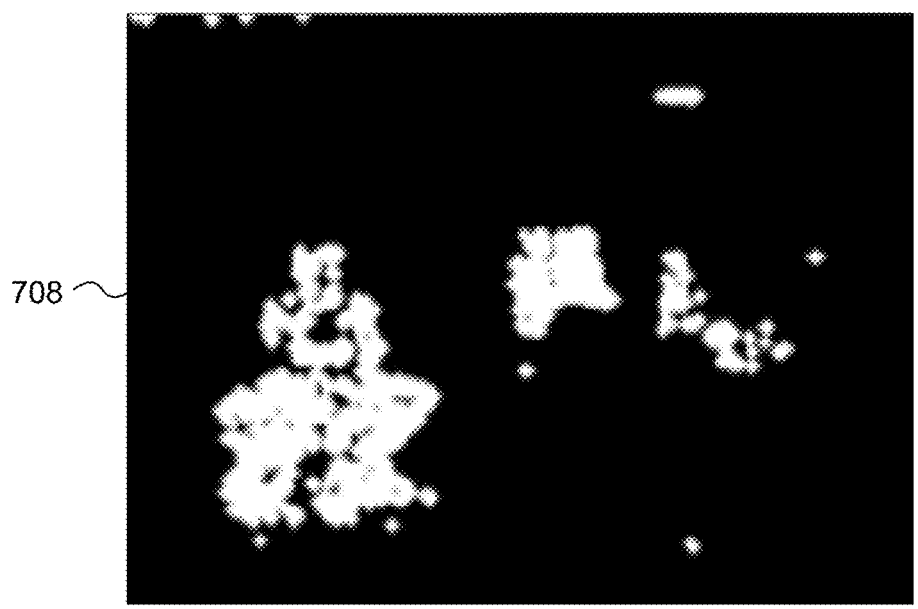
FIG. 7d shows a smoothed motion mask.

The motion mask 706 is smoothed in order to smooth transitions between black and white areas of the mask. In order to smooth the mask 706, the mask 706 may be convolved using a Gaussian filter. The resulting smoothed mask 708 is shown in FIG. 7d. The smoothed mask 708 is not restricted to binary values and may include values between 0 and 1.

Then the smoothed motion mask 708 is upscaled to match the resolution of the original images (e.g. 1440×1080 pixels). Methods of upscaling are known in the art. In step S226, the motion correction logic 108 combines the reference image $I_r(x, y)$ and the reduced noise image $S'(x, y)$ using the upscaled smoothed motion mask (denoted MASK (x, y)) to form a motion-corrected reduced noise image $S''(x, y)$. In this way, areas of the reduced noise image S' are mixed with corresponding areas of the reference image $I_r$ based on the motion mask MASK(x, y), e.g. according to the equation:

$$S''(x,y)=I_r(x,y)*MASK(x,y)+S'(x,y)*(1-MASK(x,y))$$

Furthermore, in some examples, a spatial bilateral filter may be applied to those regions which are taken from the reference picture. That is, the reference image, $I_r(x, y)$, may be spatially filtered before using it to determine the motion-corrected reduced noise image $S''(x, y)$ according to the equation given above.

In step S228 the motion-corrected, reduced noise image S'' is outputted from the processing module 100 as the result of the method. The image S'' may subsequently be used for any suitable purpose, e.g. it may be stored in a memory or used by some other processing module or displayed on a display.

Figure 8:
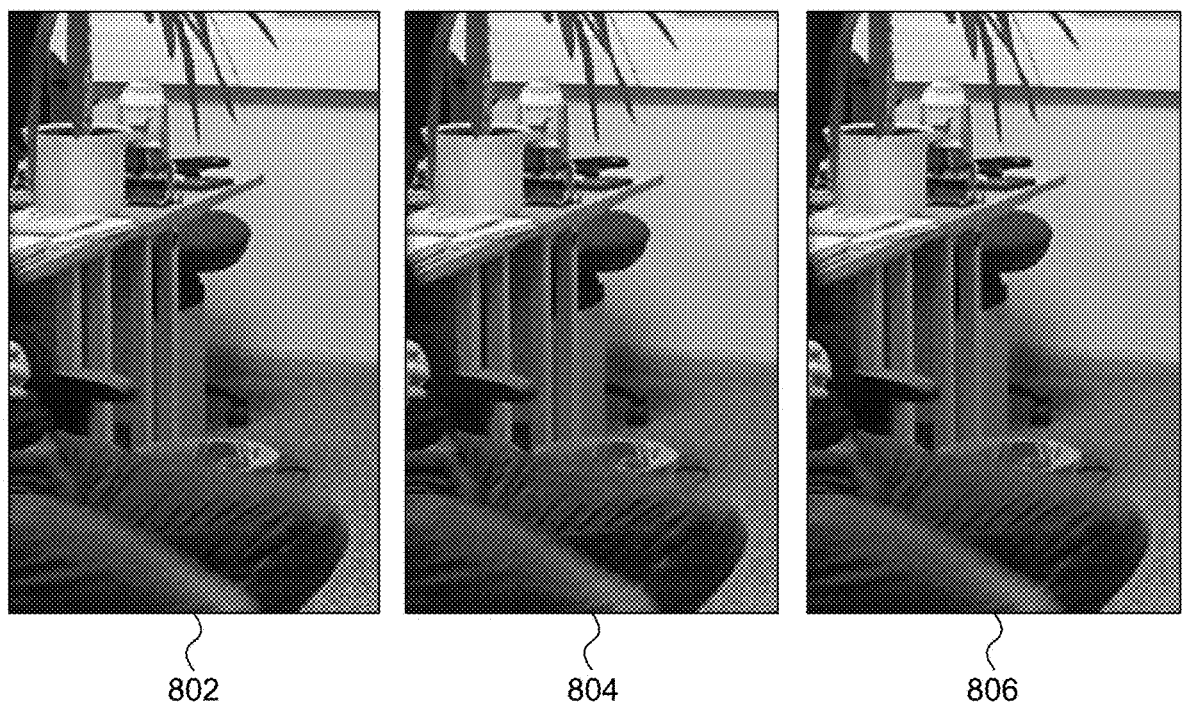
FIG. 8 shows an example of a reference image, a reduced noise image and a motion-corrected reduced noise image.

FIG. 8 shows a reference image ($I_r$) 802, a reduced noise image (S') 804 and a motion-corrected reduced noise image (S'') 806 in one example. The amount of random noise in static regions of the images 804 and 806 (e.g. on the white wall of the background in the image) is less than the random noise in the corresponding region of the reference image 802. The image 804 exhibits some motion artifacts, for example the bin and the leg seem to blur together in image 804. These motion artifacts have been corrected in image 806.

The set of images in the examples described above may comprise a plurality of images captured in a burst mode. Alternatively the set of images may comprise a plurality of frames of a video sequence. When working with videos, the method may have a few variations. With a set of video frames, it is the most recent (i.e. the last frame) to which the denoising is applied, and the previous n frames are used to denoise the last frame. The number, n, can vary depending on the needs or capabilities of the hardware. In this case the last frame of the video sequence may be used as a reference image, and hence it is not necessary to select a reference image and discard blurry images. In addition the alignment step may be performed using a plurality of n previous frames and it is computed incrementally, such that aligning the frame n−2 uses the output of the alignment of the frame n−1, and so on. Since a video sequence may contain sudden scene changes (which may be referred to as "cuts"), it may be important to detect the scene changes after aligning the images. A cut detector may be implemented based on generating a 3D histogram of 8 bins for each channel (red, green and blue), giving a total of 512 bins. The histogram of a current frame ($hist_i(r, g, b)$) is compared with a histogram the previous frame ($hist_{i-1}(r, g, b)$) and a cut is detected if the sum of the absolute differences of all bins divided by the number of pixels (N) is greater than a threshold, $\varepsilon_3$, where as an example the threshold may be in the range $0.02 \leq \varepsilon_3 \leq 0.1$. That is, a cut may be detected when the following equation is satisfied:

$$\frac{1}{N}\sum_r^8\sum_g^8\sum_b^8 \left| hist_i(r, g, b) - hist_{i-1}(r, g, b) \right| > \varepsilon_3$$

In some examples, rather than determining the histograms $hist_i(r, g, b)$ and $hist_{i-1}(r, g, b)$ using the reference image $I_r(x, y)$, the histograms may be determined using the previously computed background image (B) because this is a small (i.e. downscaled) image, e.g. formed by computing the average of the aligned images and then downscaling.

Figure 9:
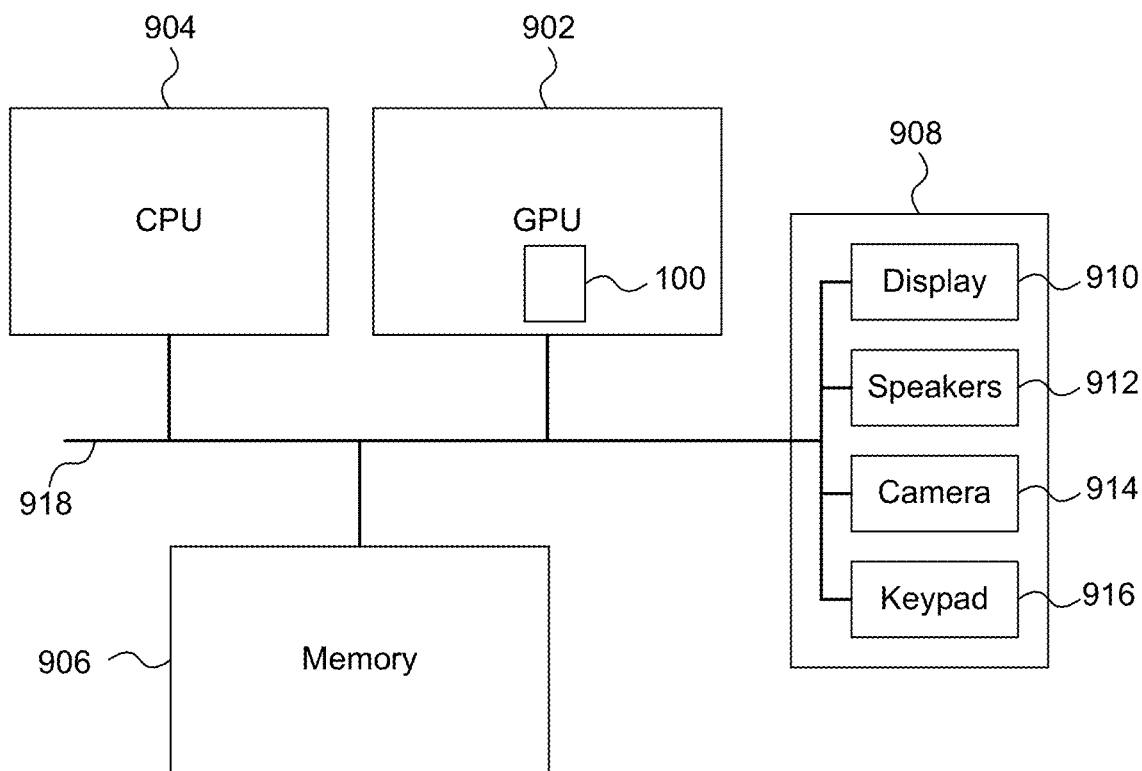
FIG. 9 is a schematic diagram of a computer system in which a processing module for forming a reduced noise image is implemented.

The processing module 100 described above can be implemented in a computer system. The computing system could be implemented in a camera, smartphone, tablet or any other suitable computing device. For example, FIG. 9 shows a computer system which comprises a GPU 902, a CPU 904 and a memory 906.

The computer system also comprises other devices 908, such as a display 910, speakers 912, a camera 914 and a keypad 916. The components of the computer system can communicate with each other via a communications bus 918. The processing module 100 may be implemented on the GPU 902 as shown in FIG. 9 in hardware or software or a combination thereof. For example, if the logic blocks (102, 104, 106 and 108) of the processing module 100 are implemented in hardware they may be formed as particular arrangements of transistors and other hardware components suited for performing the desired functions of the logic blocks as described herein. In contrast, if the logic blocks (102, 104, 106 and 108) of the processing module 100 are implemented in software they may comprise sets of computer instructions which can be stored in the memory 906 and can be provided to the GPU 902 for execution thereon. In other examples the processing module 100 could be implemented on the CPU 904. The set of images are received at the processing module 100, e.g. from the camera 914, and the processing module 100 outputs the motion-correction reduced noise image, which may then, for example, be displayed on the display 910 and/or stored in the memory 906.

Generally, any of the functions, methods, techniques or components described above (e.g. the processing module 100 and its components) can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof.

In the case of a software implementation, the module, functionality, component, unit or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component, unit or logic (e.g. the logic blocks of the processing module 100) may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component, unit or logic (e.g. the logic blocks of the processing module 100) may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component, unit or logic (e.g. the logic blocks of the processing module 100) described above, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics processing system configured to perform any of the methods described herein, or to manufacture a graphics processing system comprising any apparatus described herein. The IC definition dataset may be in the form of computer code, e.g. written in a suitable HDL such as register-transfer level (RTL) code. An example of processing an integrated circuit definition dataset at an integrated circuit manufacturing system so as to configure the system to manufacture a graphics processing system will now be described with respect to FIG. 10.

Figure 10:
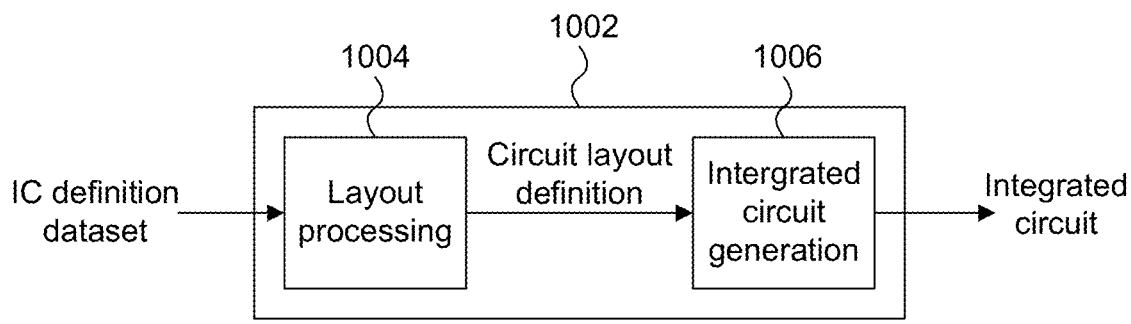
FIG. 10 shows an integrated circuit manufacturing system for generating an integrated circuit embodying a graphics processing system.

FIG. 10 shows an example of an integrated circuit (IC) manufacturing system 1002 which comprises a layout processing system 1004 and an integrated circuit generation system 1006. The IC manufacturing system 1002 is configured to receive an IC definition dataset (e.g. defining a processing module as described in any of the examples herein), process the IC definition dataset, and generate an IC according to the IC definition dataset (e.g. which embodies a processing module as described in any of the examples herein). The processing of the IC definition dataset configures the IC manufacturing system 1002 to manufacture an integrated circuit embodying a processing module as described in any of the examples herein. More specifically, the layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC. The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processing module without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some examples, an integrated circuit definition dataset could include software which runs on hardware defined by the dataset or in combination with hardware defined by the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

What is claimed is:

1. A method of forming a reduced noise image using a set of images, the method comprising:
    obtaining a plurality of transformed images;
    determining, for each of the transformed images, a respective measure of alignment of that transformed image with a reference image from the set of images;
    for each of one or more of the transformed images, determining a weight for each pixel of the transformed image in dependence on: (i) the measure of alignment of that transformed image, and (ii) the difference in pixel value between the pixel of the transformed image and the corresponding pixel of the reference image; and
    forming the reduced noise image by combining a plurality of images including said one or more of the transformed images using the determined weights, wherein the reduced noise image has less noise than the reference image.

2. The method of claim 1, wherein said obtaining a plurality of transformed images comprises applying respective transformations to at least some of the images of the set to bring them closer to alignment with the reference image from the set of images.

3. The method of claim 2, further comprising determining the transformations to apply to said at least some of the images, wherein for each of said at least some of the images the respective transformation is determined by:
    determining a set of points of the image which correspond to a predetermined set of points of the reference image; and
    determining parameters of the transformation for the image based on an error metric which is indicative of an error between a transformation of at least some of the determined set of points of the image and the corresponding points of the predetermined set of points of the reference image.

4. The method of claim 3, wherein the set of points of the image are determined using the Lucas Kanade Inverse algorithm, and wherein the Lucas Kanade Inverse algorithm is initialized using the results of a multiple kernel tracking technique.

5. The method of claim 4, wherein the multiple kernel tracking technique determines the positions of a set of candidate regions based on a similarity between a set of target regions and the set of candidate regions, wherein the target regions are respectively positioned over the positions of the predetermined set of points of the reference image, and wherein the determined positions of the set of candidate regions are used to initialize the Lucas Kanade Inverse algorithm.

6. The method of claim 1, wherein the measure of alignment for a transformed image is a misalignment parameter $\tau_i$ determined as the sum, over all of the pixel positions (x, y) of the transformed image, of the absolute differences between the transformed image $W_i(x, y)$ and the reference image $I_r(x, y)$.

7. The method of claim 1, further comprising selecting one of the images of the set of images to be the reference image by:
    determining sharpness indications for the images of the set of images; and
    based on the determined sharpness indications, selecting the sharpest image from the set of images to be the reference image.

8. The method of claim 7, further comprising discarding an image if the determined sharpness indication for the image is below a sharpness threshold.

9. The method of claim 7, wherein the sharpness indications are sums of absolute values of image Laplacian estimates for the respective images.

10. The method of claim 1, further comprising, for each of the transformed images, determining whether the respective measure of alignment indicates that the alignment of the transformed image with the reference image is below a threshold alignment level, and in dependence thereon selectively including the transformed image as one of said one or more of the transformed images for which weights are determined.

11. The method of claim 1, wherein either:
    said plurality of images which are combined to form the reduced noise image further includes the reference image; or
    said plurality of images which are combined to form the reduced noise image does not include the reference image.

12. The method of claim 1, wherein the set of images comprises a plurality of images captured in a burst mode.

13. The method of claim 1, wherein the set of images comprises a plurality of frames of a video sequence.

14. A hardware processing module for forming a reduced noise image using a set of images, the hardware processing module comprising:

alignment logic configured to:
  obtain a plurality of transformed images; and
  determine, for each of the transformed images, a respective measure of alignment of that transformed image with a reference image from the set of images; and
combining logic configured to:
  for each of one or more of the transformed images, determine a weight for each pixel of the transformed image in dependence on: (i) the measure of alignment of that transformed image, and (ii) the difference in pixel value between the pixel of the transformed image and the corresponding pixel of the reference image; and
  form a reduced noise image by combining a plurality of images including said one or more of the transformed images using the determined weights, wherein the reduced noise image has less noise than the reference image.

15. The hardware processing module of claim 14, wherein the alignment logic is configured to obtain the plurality of transformed images by applying respective transformations to at least some of the images of the set to bring them closer to alignment with the reference image from the set of images.

16. The hardware processing module of claim 14, wherein the measure of alignment for a transformed image is a misalignment parameter $\tau_i$ determined as the sum, over all of the pixel positions (x, y) of the transformed image, of the absolute differences between the transformed image $W_i(x, y)$ and the reference image $I_r(x, y)$.

17. The hardware processing module of claim 14, further comprising selection logic configured to select one of the images of the set of images to be the reference image by:
  determining sharpness indications for the images of the set of images; and
  based on the determined sharpness indications, selecting the sharpest image from the set of images to be the reference image,
  wherein the selection logic is further configured to discard an image such that it is not provided to the alignment logic if the determined sharpness indication for the image is below a sharpness threshold.

18. The hardware processing module of claim 14, wherein the alignment logic is further configured to, for each of the transformed images, determine whether the respective measure of alignment indicates that the alignment of the transformed image with the reference image is below a threshold alignment level, and in dependence thereon selectively include the transformed image as one of said one or more of the transformed images to be passed to the combining logic for which weights are to be determined.

19. The hardware processing module of claim 18, further comprising motion correction logic configured to apply motion correction to the reduced noise image by:
  determining motion indications indicating levels of motion for areas of the reduced noise image; and
  mixing areas of the reduced noise image with corresponding areas of the reference image based on the motion indications to form a motion-corrected, reduced noise image.

20. A non-transitory computer readable storage medium having stored thereon processor executable instructions that when executed cause at least one processor to form a reduced noise image using a set of images, the forming a reduced noise image comprising:
  obtaining a plurality of transformed images;
  determining, for each of the transformed images, a respective measure of alignment of that transformed image with a reference image from the set of images;
  for each of one or more of the transformed images, determining a weight for each pixel of the transformed image in dependence on: (i) the measure of alignment of that transformed image, and (ii) the difference in pixel value between the pixel of the transformed image and the corresponding pixel of the reference image; and
  forming the reduced noise image by combining a plurality of images including said one or more of the transformed images using the determined weights, wherein the reduced noise image has less noise than the reference image.

* * * * *

UNITED STATES PATENT AND TRADEMARK OFFICE
CERTIFICATE OF CORRECTION

PATENT NO. : 11,282,216 B2
APPLICATION NO. : 16/865884
DATED : March 22, 2022
INVENTOR(S) : Marc Vivet and Paul Brasnett It is certified that error appears in the above-identified patent and that said Letters Patent is hereby corrected as shown below:

In the Specification

Column 11, Line 54:
$\tau_i = \tau_{xy} |W_i(x,y) - I_r(x,y)|$.
Should read as:
$$\tau_i = \sum_{xy} |W_i(x,y) - I_r(x,y)|$$

Column 14, Line 47:
where $B^B(x,y)$, $B^G(x,y)$ and $B^B(x,y)$
Should read as:
where $B^R(x,y)$, $B^G(x,y)$ and $B^B(x,y)$ Signed and Sealed this
Fifth Day of July, 2022

Katherine Kelly Vidal
*Director of the United States Patent and Trademark Office*